(12) United States Patent
Nagai (10) Patent No.: US 7,616,331 B2
(45) Date of Patent: Nov. 10, 2009

(54) IMAGE PROCESSING APPARATUS, IMAGE PROCESSING METHOD, AND PROGRAM

(75) Inventor: Jun Nagai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/408,164

(22) Filed: Mar. 20, 2009

(65) Prior Publication Data

US 2009/0180148 A1      Jul. 16, 2009

Related U.S. Application Data (63) Continuation of application No. 10/720,233, filed on Nov. 25, 2003, now Pat. No. 7,532,336.

(30) Foreign Application Priority Data

Nov. 28, 2002  (JP) .............................. 2002-345927

(51) Int. Cl.
G06F 15/00 (2006.01)
(52) U.S. Cl. ..................... 358/1.13; 358/462; 358/1.18; 715/200
(58) Field of Classification Search .................. 358/1.1, 358/1, 13, 452, 453, 462, 1.9, 1.18; 382/176; 715/200, 204
See application file for complete search history.

(56) References Cited

U.S. PATENT DOCUMENTS

| 5,610,728 | A | 3/1997 | Sobue |
|---|---|---|---|
| 6,362,894 | B1 | 3/2002 | Shima |
| 6,981,213 | B2 | 12/2005 | Barmettler |
| 2003/0035144 | A1 | 2/2003 | Shima |
| 2003/0142349 | A1 | 7/2003 | Matsunaga et al. |
| 2005/0286090 | A1* | 12/2005 | Ahne et al. .................. 358/452 |
| 2008/0094669 | A1* | 4/2008 | Imai ........................... 358/452 |

FOREIGN PATENT DOCUMENTS

| JP | 11-203100 | 7/1999 |
|---|---|---|
| JP | 11-212889 | 8/1999 |
| JP | 2000-39982 | 2/2000 |
| JP | 2000-276311 | 10/2000 |
| JP | 2002-278727 | 9/2002 |

* cited by examiner

*Primary Examiner*—Kimberly A Williams
(74) *Attorney, Agent, or Firm*—Fitzpatrick, Cella, Harper & Scinto (57) ABSTRACT

The present invention discloses an image processing method and an image processing apparatus which is capable of preventing wasteful consumption of toner and an increase in processing time when a page including information not desired by a user such as an advertisement on a Web page is printed. According to the image forming method of the present invention, the image forming method includes a mode for printing image data without change and a mode for simplifying and printing the image data or not printing the image data, and executes print processing according to a mode set by the user.

7 Claims, 11 Drawing Sheets

IMAGE PROCESSING APPARATUS, IMAGE PROCESSING METHOD, AND PROGRAM

This application is a continuation application of application Ser. No. 10/720,233, now allowed, filed Nov. 25, 2003, which is incorporated herein by reference.

FIELD OF THE INVENTION

The present invention relates to a technique for printing based on data.

BACKGROUND OF THE INVENTION

In recent years, there has been realized a system which connects a server apparatus, for example, a World Wide Web server (hereinafter referred to as WWW server), which holds various kinds of information, and a computer (Web client), in which special purpose software (WWW browser) for accessing this WWW server using the HTTP (HyperText Transfer Protocol) is installed, with a network so as to make it possible for the Web client to refer to data on the WWW server.

With this system, the data on the WWW server can be downloaded to the Web client using the WWW browser. Thus, a user of the Web client is capable of printing the data on the WWW server by, for example, instructing a printer usable from the Web client to print and output data which is stored in the Web client once. In addition, for example, as described in JP-A-2000-39982, a printer is capable of acquiring data from a WWW server according to an instruction from a computer to perform printing on the basis of the acquired data.

However, although information desired by the user is included in the data on the WWW server which the user refers to using the WWW browser, information not required by the user may be included therein.

In the case where the user refers to data of the HTML format such as a Web page with the WWW browser, the WWW browser sequentially acquires the data, which is referred to by the user, from the data of the HTML format while interpreting the data of the HTML format and displays the Web page. In this case, information which is less important for the user and information which is highly important for the user may be mixed in information displayed by the WWW browser.

In instructing printing from the WWW browser, in general, entire information displayed on a display is printed. Therefore, when the user instructs printing of a certain Web page, even if information which the user does not need or information with low necessity is included in the page, entire information in the page is converted into print data and printed.

In the case of the data of the HTML format, most of information is referred to according to hyperlink, and the WWW browser analyzes the information and acquires and displays necessary information. Then, it is difficult for the user to change a data acquisition operation of the WWW browser according to importance for information. After all, information which the user does not wish to print is included in print data.

As an example of such information which the user does not wish to print, there is image information. In recent years, a Web page tends to include a large quantity of image information, and the image information itself often becomes large in size. Thus, in the case where a Web page including many images is converted into print data and sent to a printer, processing load of the printer increases, and the printer cannot perform high-speed print processing. In addition, printing of an image consumes a relatively large quantity of recording materials compared with printing of data such as text data.

SUMMARY OF THE INVENTION

The present invention has been devised in view of such drawbacks of the related art, and it is an object of the present invention to, for example, in printing information including image information unnecessary for a user such as a Web page, improve a printing speed and make it possible for the user to choose how to print the image information to thereby realize prevention of wasteful toner consumption.

According to the present invention, the foregoing object is attained by providing an image processing apparatus which processes printing based upon data, comprising: print mode acquisition means which acquires a type of a print mode set by a user out of a plurality of print modes including a first mode for printing an image based upon data, a second mode for printing another image instead of the image based upon data, and a third mode for not printing the image based upon data; and control means which controls print processing according to the type of the print mode acquired by the print mode acquisition means.

According to another aspect of the present invention, the foregoing object is attained by providing an image processing method for processing printing based upon data, comprising controlling print processing in a print mode which is set by a user out of a plurality of print modes including a first mode for printing an image based upon data, a second mode for printing another image instead of the image based upon data, and a third mode for not printing the image based upon data.

According to still another aspect of the present invention, the foregoing object is attained by providing a program which processes printing based upon data, the program causing a computer to execute: a print mode acquisition step of acquiring a type of a print mode set by a user out of a plurality of print mode including a first mode for printing an image based upon data, a second mode for printing another image instead of the image based upon data, and a third mode for not printing the image based upon data; and a print processing step of performing print processing according to the type of the print mode acquired in the print mode acquisition step.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

First Embodiment

Figure 1:
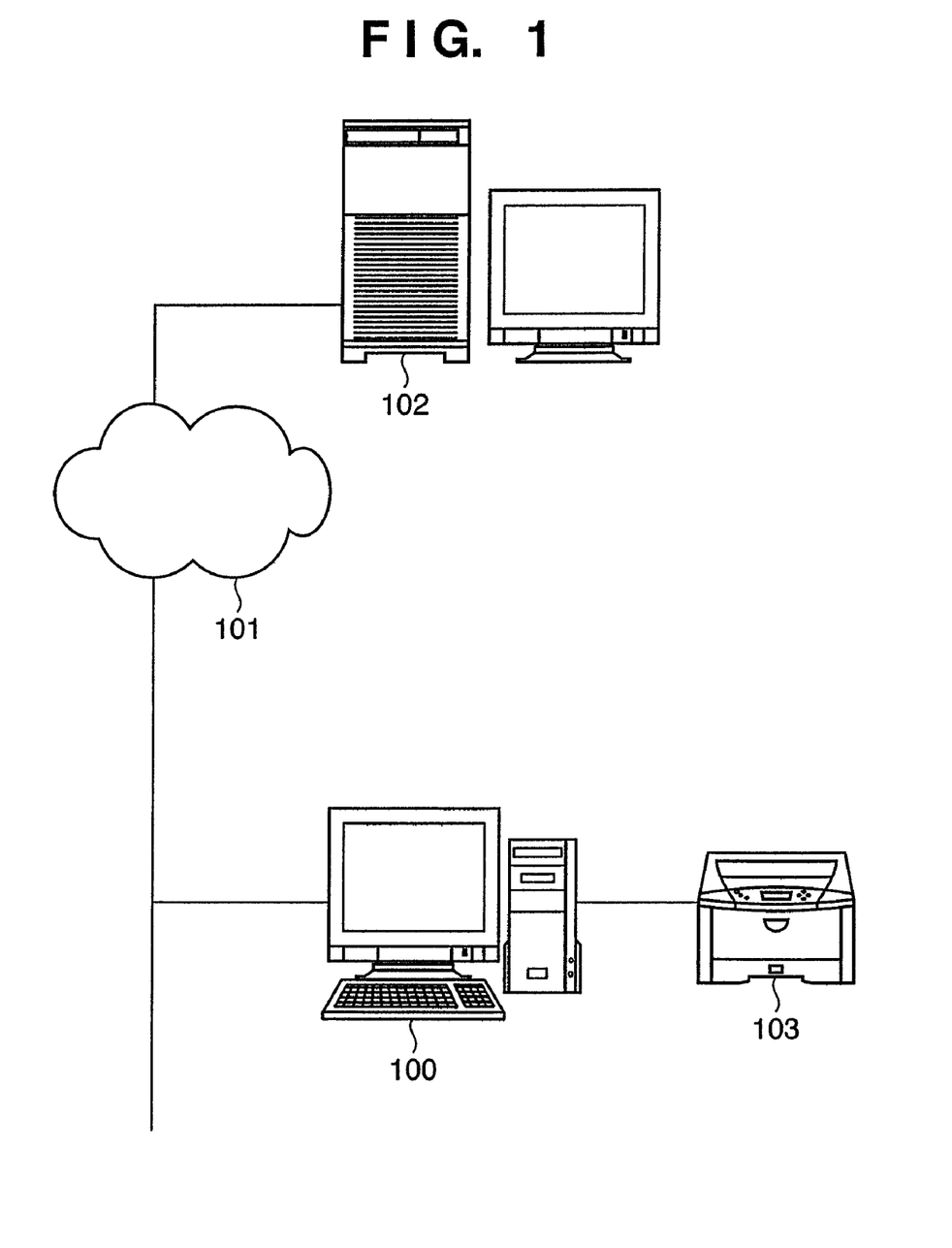
FIG. 1 is a diagram showing an example of an overall structure of an image forming system using an image processing apparatus.

FIG. 1 is a diagram showing an example of a structure of an image forming system using a printer as an example of an image processing apparatus in accordance with an embodiment of the present invention.

In the figure, reference numeral 100 denotes a host computer, which includes a CPU, a RAM, a ROM, an external storage (e.g., a hard disk drive), a network interface, a printer port (a serial port or a parallel port), and the like, and is generally realized by a general purpose computer which is on the market as a personal computer.

In this system, the host computer 100 having a WWW browser program stored in the external storage is made connectable to a WWW server 102 through a not-shown network interface and via the Internet 101. In addition, a printer 103 is connected to the host computer 100 through the printer port.

When the host computer 100 acquires information held in the WWW server 102 such as a Web page, first, a WWW browser on the host computer 100 is started up, and this WWW browser accesses the WWW server 102 to acquire the information via the Internet 101 using an OS or the like running on the host computer 100. This acquired information is analyzed by the WWW browser to be displayed on a display. In addition, in printing the acquired information, the WWW browser on the host computer 100 issues a print instruction, and the acquired information is converted into print data, to which the printer 103 is capable of applying print processing, by the WWW browser via the printer driver or the like and sent to the printer 103.

The printer having received the print data executes the print processing on the basis of the acquired data.

Figure 2:
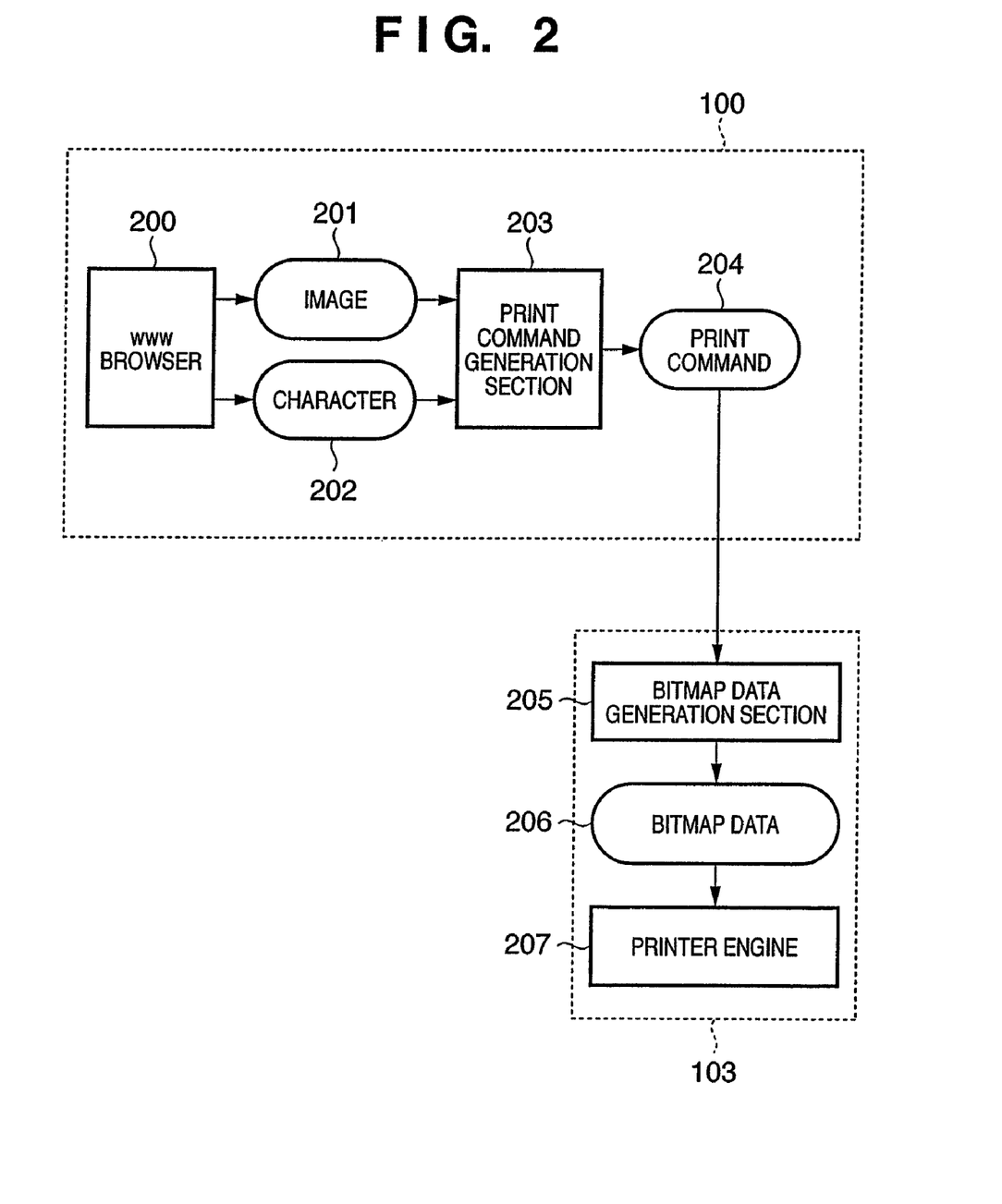
FIG. 2 is a diagram explaining a constitution for printing and a flow of data.

FIG. 2 is a diagram showing a flow of data at the time of printing in the system of FIG. 1 and a constitution for the print processing.

When an print instruction is given to a WWW browser 200 of the host computer 100 from, for example, a user, the WWW browser 200 (an operating system may be used also as the WWW browser) generates instructions for drawing an image 201 and a character 202. These instructions are converted into a print command 204 of a data format, which the printer 103 is capable of analyzing, by a print command generation section 203 such as a printer driver and sent to the printer 103 through a communication cable. In this way, the host computer 100 controls print processing which uses the printer 103.

Upon receiving the print command, the printer 103 analyzes the print command in a bitmap data generation section 205 and creates bitmap data using a drawing routine corresponding to the respective drawing instructions in the command. The created bitmap data 206 is converted into a video signal by a video interface block. Then, the bitmap data 206 is outputted to a printer engine 207 and printed.

Note that, although the host computer 100 and the printer 103 are shown as separate bodies, the respective sections of the host computer 100 may be incorporated in the printer 103.

Figure 3:
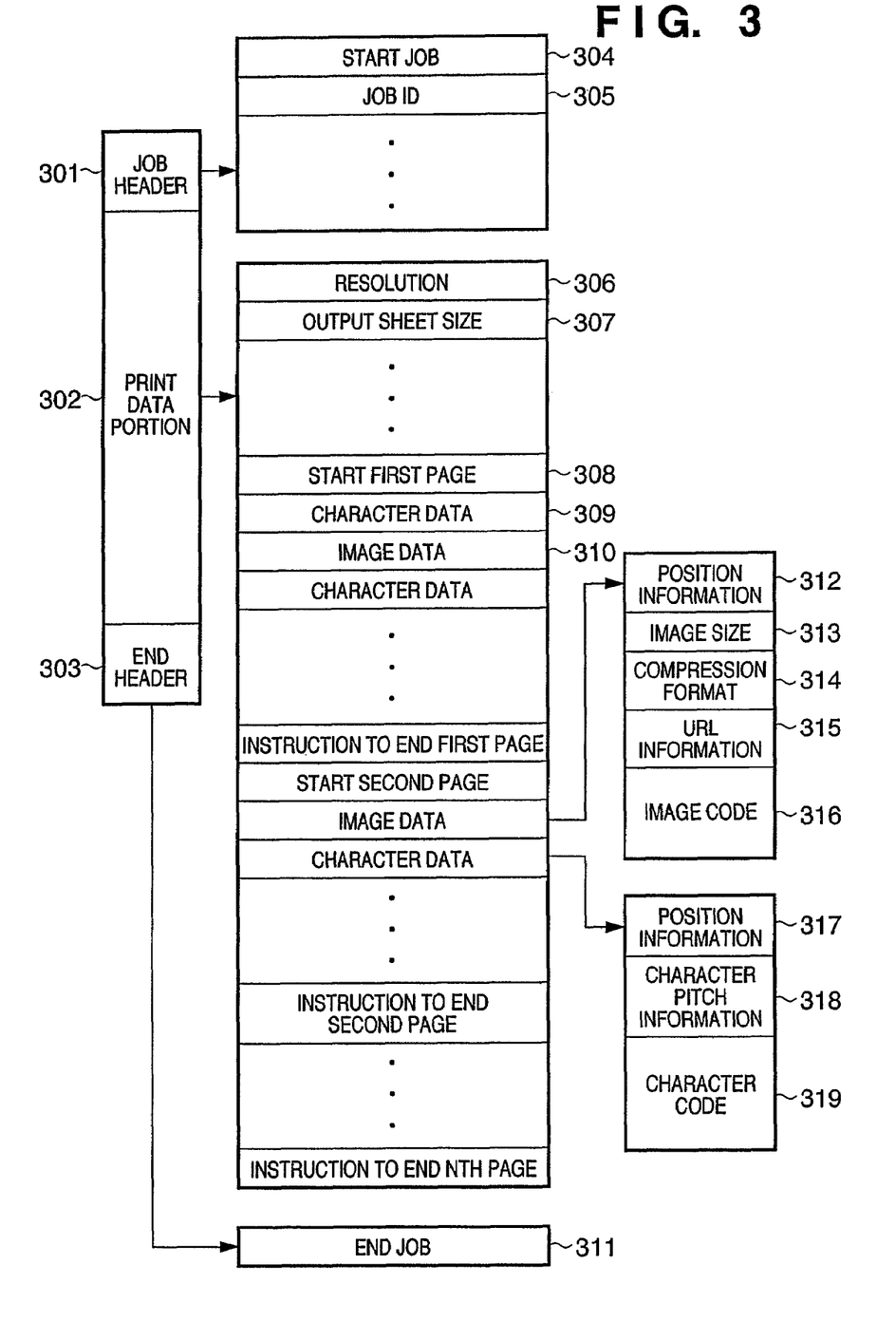
FIG. 3 is a diagram showing an example of a constitution of an available print command.

FIG. 3 is a diagram showing an example of data constitution of a print command to be sent to the printer 103. FIG. 3 shows a print command of output data in which the number of output pages is N. The print command consists of a job header 301, a print data section 302, an end header section 303. In addition, the job header 301 includes job start information 304 and information such as a job ID 305 for the job. The print data section 302 includes information such as a resolution 306 and an output sheet size 307 at the time of output as well as data such as start instructions 308 for pages, character data 309, and image data 310. Further, the end header 303 includes job end information 311 of the job.

The bitmap data generation section 205 in the printer 103 analyzes and processes this print command, whereby the print command is converted into bitmap data.

Note that, as shown in the figure, the image data consists of position information 312, an image size 313, a compression format 314, URL information 315, and an image code 316, and the character data consists of position information 317, character pitch information 318, and a character code 319.

Figure 4:
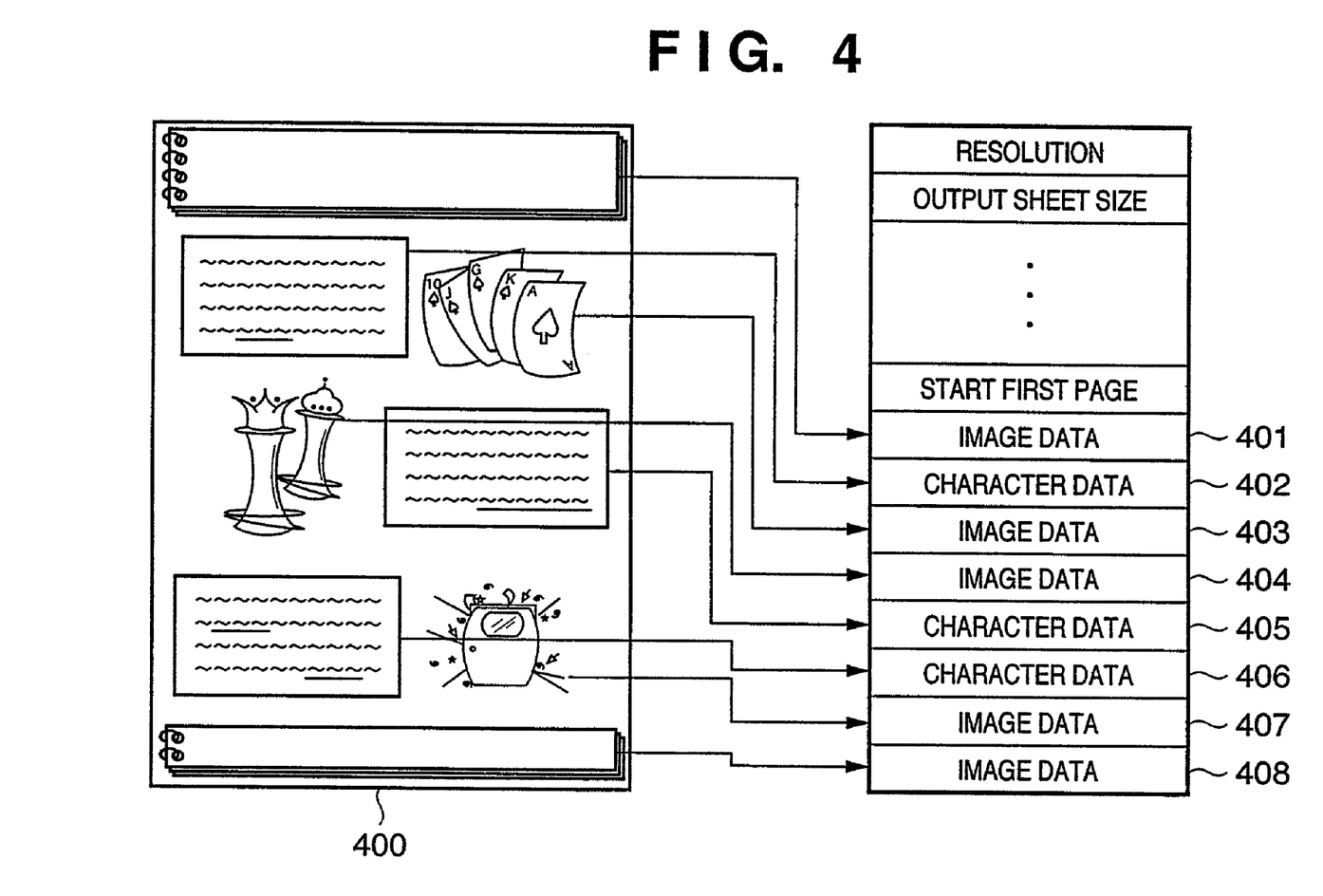
FIG. 4 is a diagram explaining a Web page and a constitution of a print command corresponding to the Web page.

FIG. 4 is a diagram showing an example of a state in which information held by the WWW server 102 is displayed by the WWW browser of the host computer 100. Here, image information is displayed together with character information on a display window of the WWW browser. As shown in the figure, the displayed pieces of information are converted into data of a print data section corresponding to character data 402, 405, and 406, and image data 401, 403, 404, 407, and 408, respectively.

Figure 5:
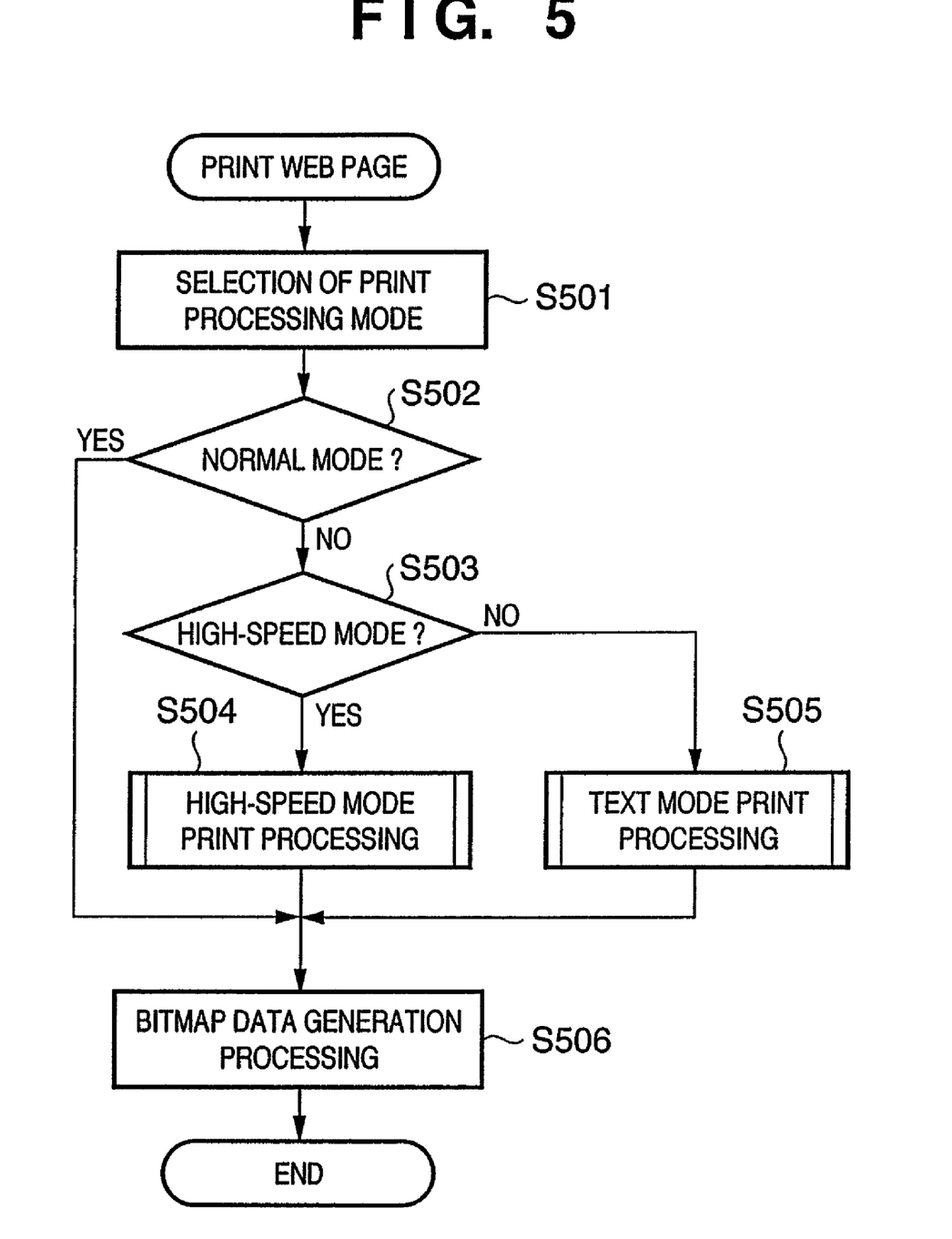
FIG. 5 is a flowchart explaining entire print processing.

FIG. 5 is a flowchart showing entire print processing of the printer 103 in FIG. 1.

First, the printer 103 performs mode selection processing with respect to print processing for a Web page (step S501). In this embodiment, it is assumed that selectable modes are a normal mode, a high-speed mode, and a text mode. However, other modes may be selectable, or only two of the modes may be selected.

Here, the normal mode is a normal print mode for printing a page just as displayed on the WWW browser. The high-speed mode is a mode for, instead of printing image data in a page displayed on the WWW browser, printing information identifying image data, which is information indicating reference to the image data, for example, URL (Uniform Resource Locater) in a position where the image is arranged in the page. In addition, the text mode is a mode for not printing image information in a page displayed on the WWW browser but printing the page after cutting down a part where the image is arranged and flowing character data into the part to change a layout.

It is possible to use an arbitrary method for selection of the print processing mode. For example, the print processing mode may be selected on a setting screen of a printer driver corresponding to the printer 103, which is installed in the host computer 100, and notified to the printer from the host computer 103. Alternatively, the print processing mode may be selected from a setting panel provided in the printer 103 and stored in a storage such as a nonvolatile memory in the printer 103. Note that, in the case where processing for selecting a mode is performed on the host computer 100 side, mode selection on the printer 103 becomes unnecessary, and step S501 can be omitted.

Figure 6:
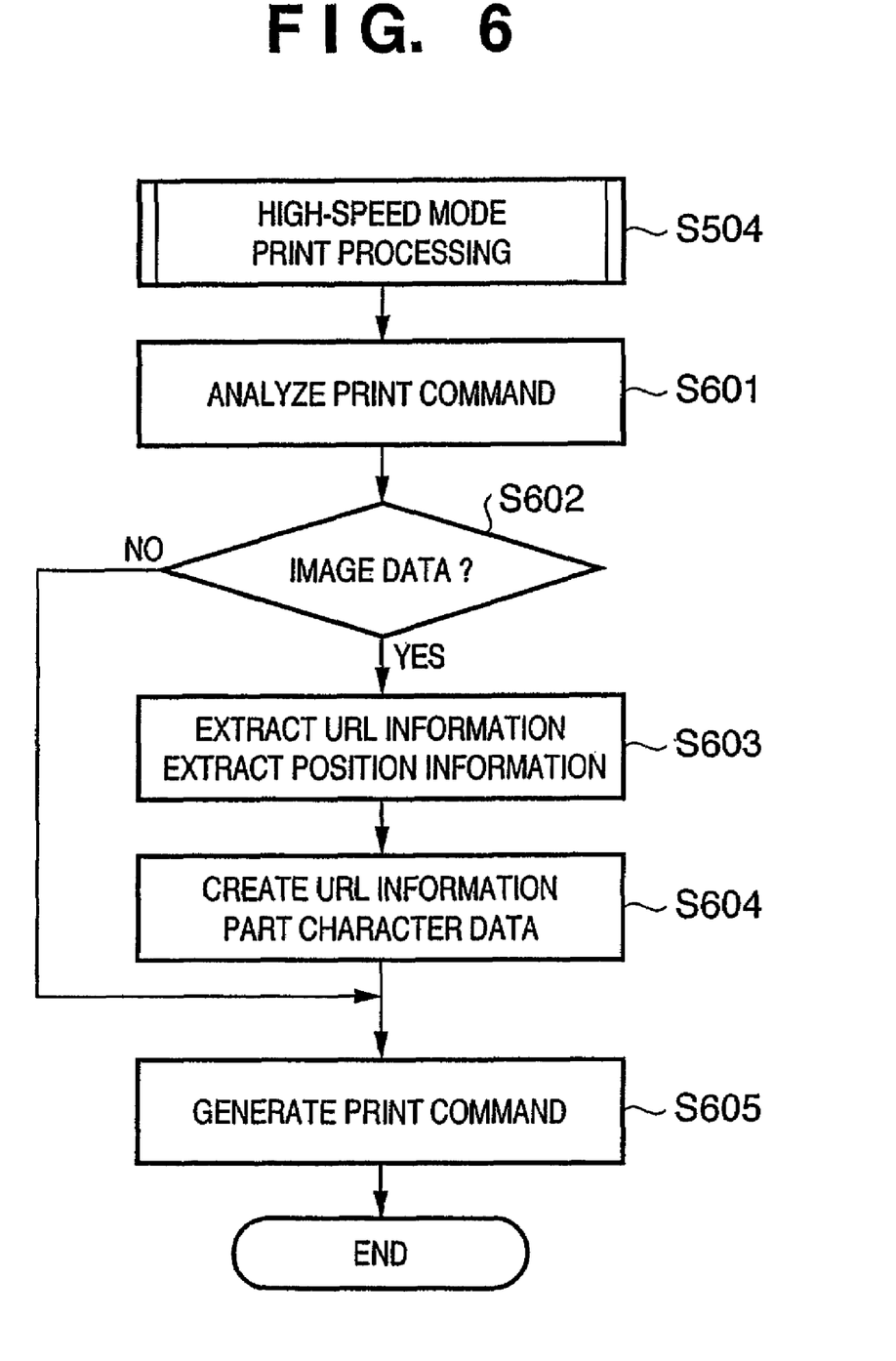
FIG. 6 is a flowchart explaining details of high-speed mode print processing.

In step S502, the printer 103 refers to the notification from the host computer 100 or an internal storage and judges whether or not the selected mode is the normal mode. If the normal mode is not selected, in step S503, the printer 103 further judges whether or not the selected mode is the high-speed mode. Here, if the selected mode is the high-speed mode, in step S504 for high-speed mode print processing, a print command is created anew. FIG. 6 shows a flowchart of the high-speed mode print processing.

In the high-speed mode, the inputted print command is analyzed by the bitmap data formation section in step S601, and in step S602, it is judged whether data of a print data section is an image data portion or a character data portion. As a result, if the data is judged as the character data portion, the data is not changed. On the other hand, if the data is judged as the image data portion, the position information 312 and the URL information 315 shown in FIG. 3 are extracted from the data in step S603, and the other pieces of information including the image code are directly deleted from the data. In step S604, the printer 103 creates character data for printing a URL in a place, where the image is originally arranged, on the basis of the position information and the URL information extracted in step S603. In step S605, the printer 103 generates a new print command. On the basis of these print commands created anew, the printer 103 generates bitmap data in step S506 and executes print processing.

Figure 7:
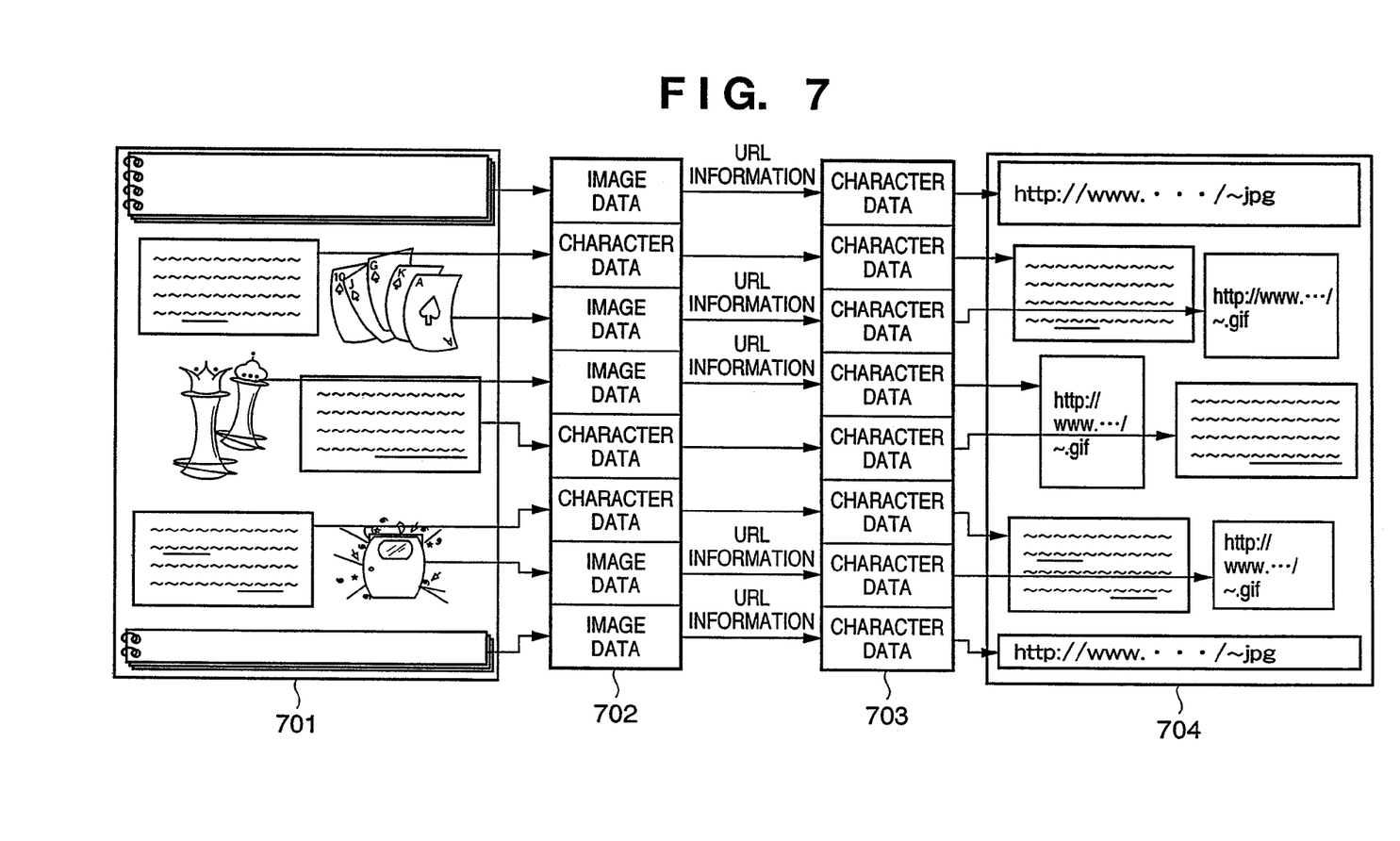
FIG. 7 is a diagram explaining correspondence among the high-speed mode print processing, a print command, and a print result.

FIG. 7 is a diagram schematically showing processing in the high-speed mode explained in FIG. 6.

There is a Web page in which image information and character information are mixed as indicated by 701 in the figure, and a print command indicated by 702 is generated by print processing. In processing this print command, if the high-speed mode has been selected, image data portions are converted into character data including URL information as indicated by 703. This character data becomes a new print command, whereby a print output result as indicated by 704 can be obtained.

Figure 8:
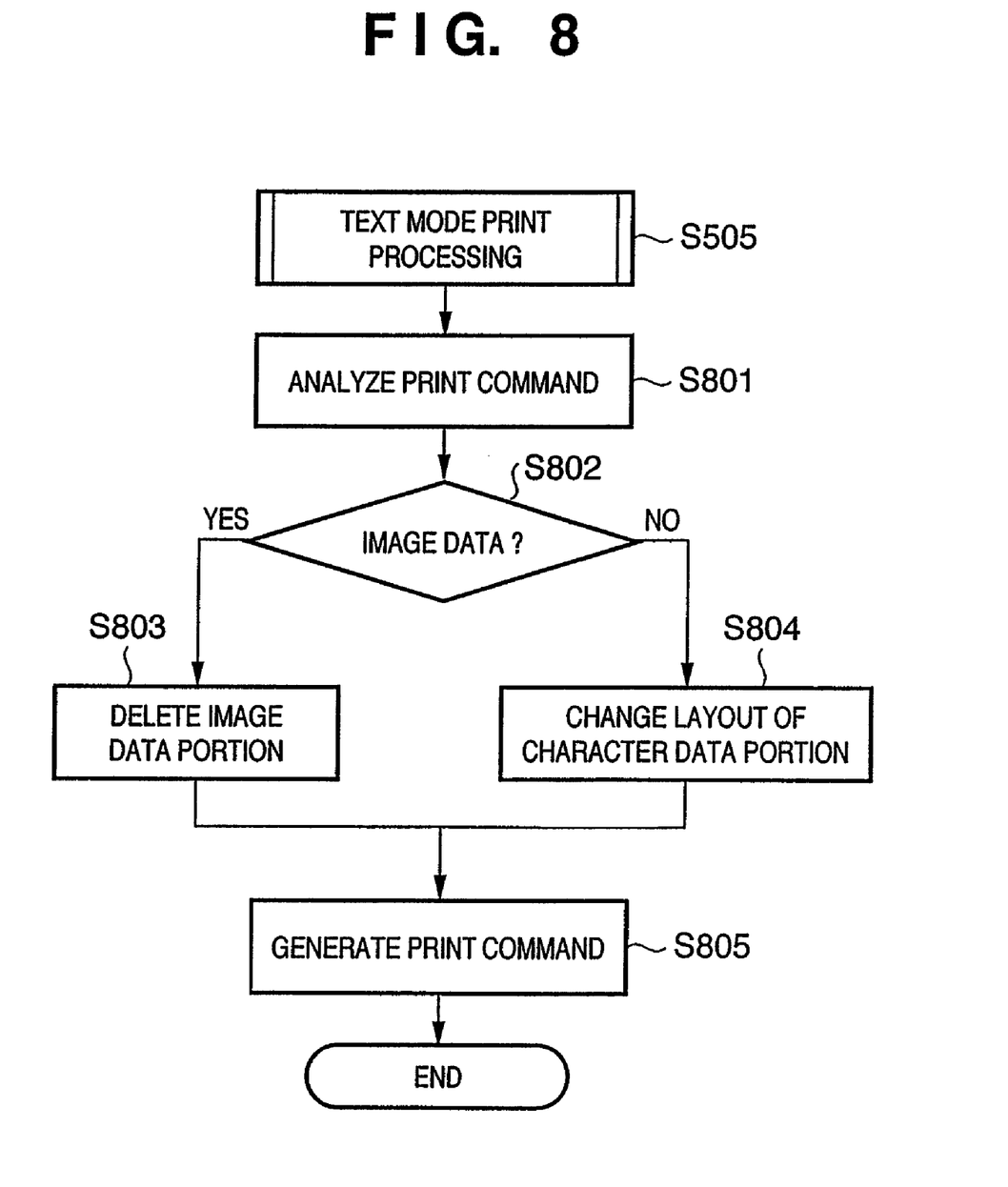
FIG. 8 is a flowchart explaining details of text mode print processing.

In addition, in the selection of a print mode in step S501, if the text mode is selected, a new print command is created anew in step S505 for text mode print processing. FIG. 8 shows a flowchart of the text mode print processing.

In the text mode, first, contents of the inputted print command are analyzed in step S801, and it is judged in step S802 whether data of a print data section thereof is an image data portion or a character data portion. As a result, if the data is judged as the image data portion, the data is not subjected to any processing in step S803 and is directly deleted. On the other hand, if the data is judges as the character data portion, a layout is changed in processing of step S804.

In changing the layout, after subjecting respective character data to integration processing once to turn the data into one character data, the printer 103 creates a character data portion anew from information such as a sheet size, an effective print area, and a character pitch included in a print data section to generate a new print command in step S805. The printer 103 executes generation of bitmap data (step S506) and print processing on the basis of these newly created print commands.

Figure 9:
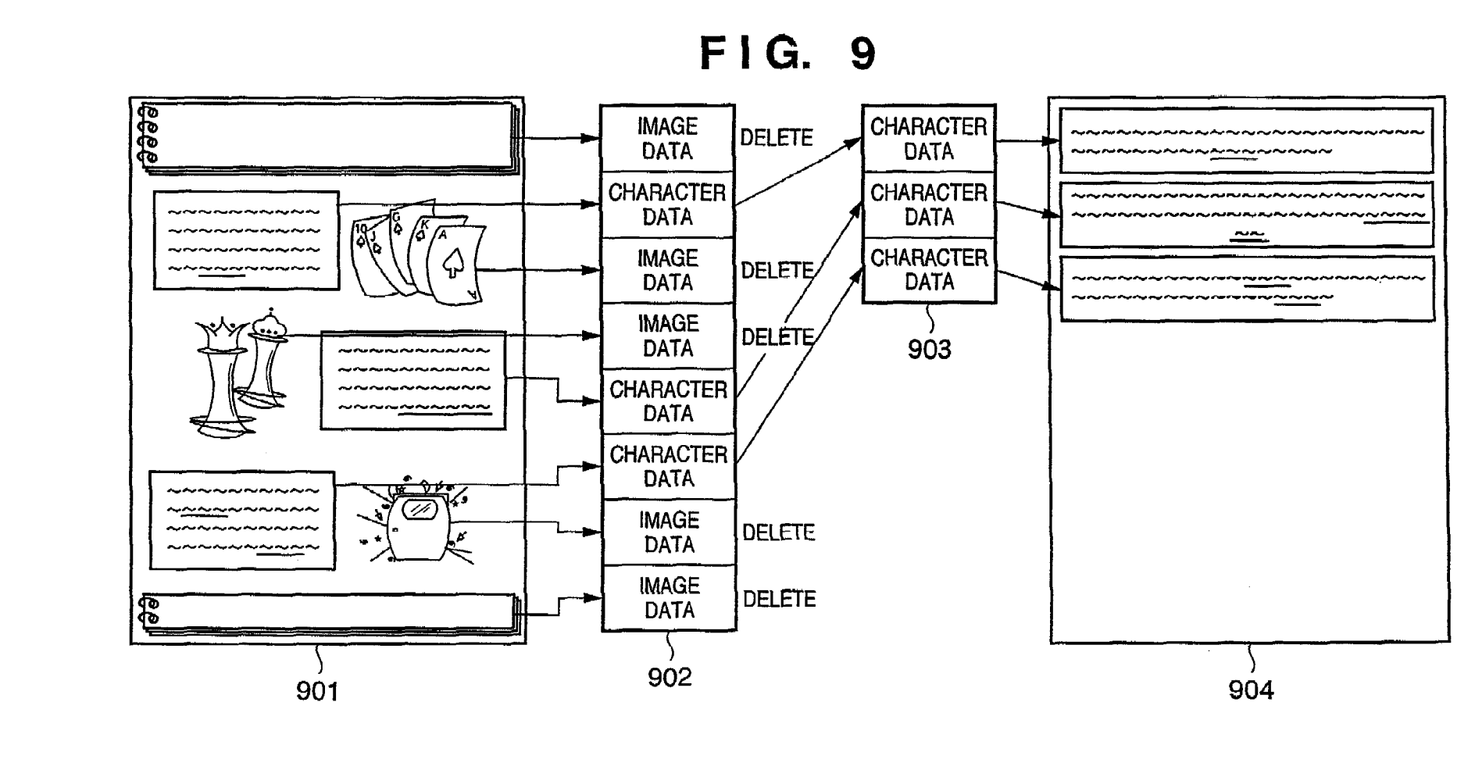
FIG. 9 is a diagram explaining correspondence among the text mode print processing, a print command, and a print result.

FIG. 9 is a diagram schematically showing the processing in the text mode explained in FIG. 8.

As indicated by 901 in the figure, there is a Web page in which image information and character information are mixed, a print command as indicated by 902 is generated by print processing. In processing this print command, if the text mode has been selected, as indicated by 903, the image data portion is deleted, and a layout is changed for the character data portion. This print command turns into a new print command, and print output result indicated by 904 can be obtained.

As described above, according to the first embodiment of the present invention, in printing a Web page, a method of processing image information of the Web page is made selectable, whereby the image information can be easily removed from print information, and print processing can be performed at a high speed and with toner consumption suppressed.

Second Embodiment

An invention in accordance with a second embodiment of the present invention is an information processing apparatus which includes: a thumbnail generation section which generates thumbnails of image data included in data instructed to be printed; a display section which displays a user interface with which a user is capable of setting importance for each thumbnail; and a print command section which, in accordance with the importance, generates a print command for data instructed to be printed, and an image processing apparatus which receives a print command added with importance for the image data and performs image formation, the image processing apparatus including: a judgment section which judges importance for the image data included in the print command; and an image forming section which performs image formation of the image data with ordinary image pattern formation processing or processing capable of forming an image faster than usual according to the judged importance.

Figure 10A:
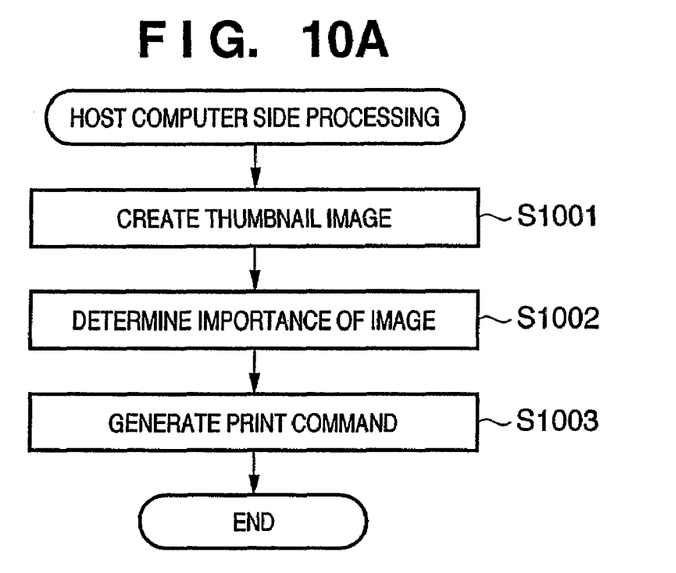
FIG. 10A is a flowchart explaining entire print processing.
Figure 10B:
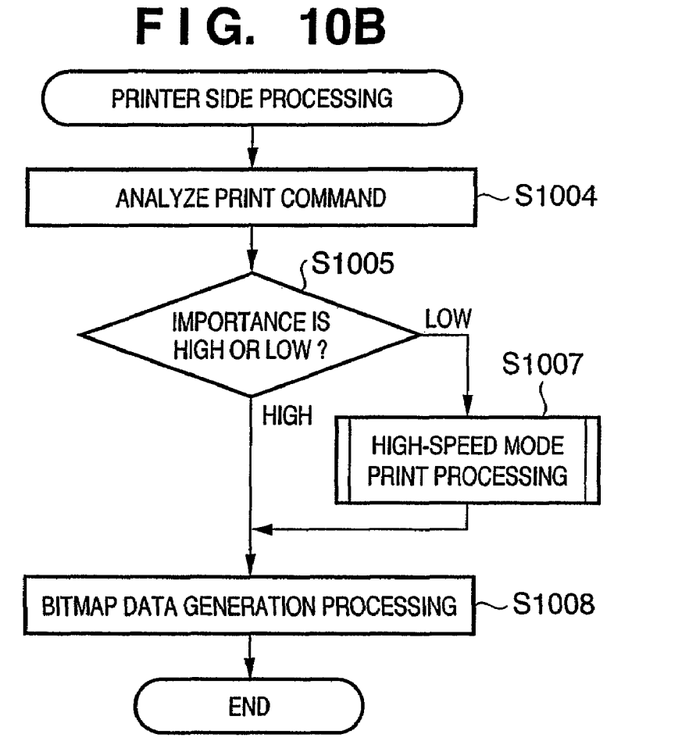
FIG. 10B is a flowchart explaining entire print processing.

FIGS. 10A and 10B are flowcharts explaining print processing in an image forming system which uses the image processing apparatus in accordance with the second embodiment of the present invention. FIG. 10A shows processing which is performed in the host computer 100, and FIG. 10B shows processing which is performed on the printer 103 side.

The print processing for a Web page in the second embodiment is characterized by generating thumbnails of image data included in the Web page which is instructed to be printed, causing a user to select importance for respective images, and switching the normal mode and the high-speed mode according to set importance.

In step S1001, the host computer 100 creates thumbnails of respective image data included in the Web page which is instructed to be printed. Next, in step S1002, the host computer 100 displays the thumbnails created in the previous step S1001 and causes the user to select importance for each piece of image information included in each page to be printed. A printer driver can present this selection screen.

The user selects, for example, pull-down menus or radio buttons which are displayed adjacent to the thumbnails displayed in the selected screen to thereby select importance for the respective images. In this case, setting may be required for all the images. However, it is also possible to, for example, set default importance to low importance and cause the user to select only images with high importance. In addition, in this embodiment, there are only two stages of importance, namely, high and low. However, if two or more stages of importance are to be selected, the number of stages of importance is arbitrary.

In addition, a method of setting the importance may be any method such as setting using a GUI or other setting as long as the user can set importance for respective images existing in a Web page while looking at thumbnails.

Further, in the case where importance for image information is set, it is also possible to adopt a method with which importance can be determined collectively.

The processing for selecting importance for images ends as the user selects an "end" button on the selection screen.

When the processing for selecting importance ends, the host computer 100 generates a print command on which the importance is reflected. More specifically, the host computer 100 inserts information on importance anew in the constitution of the image data portion shown in FIG. 3 and holds set values of importance for the respective images in the image data portion.

Figure 11:
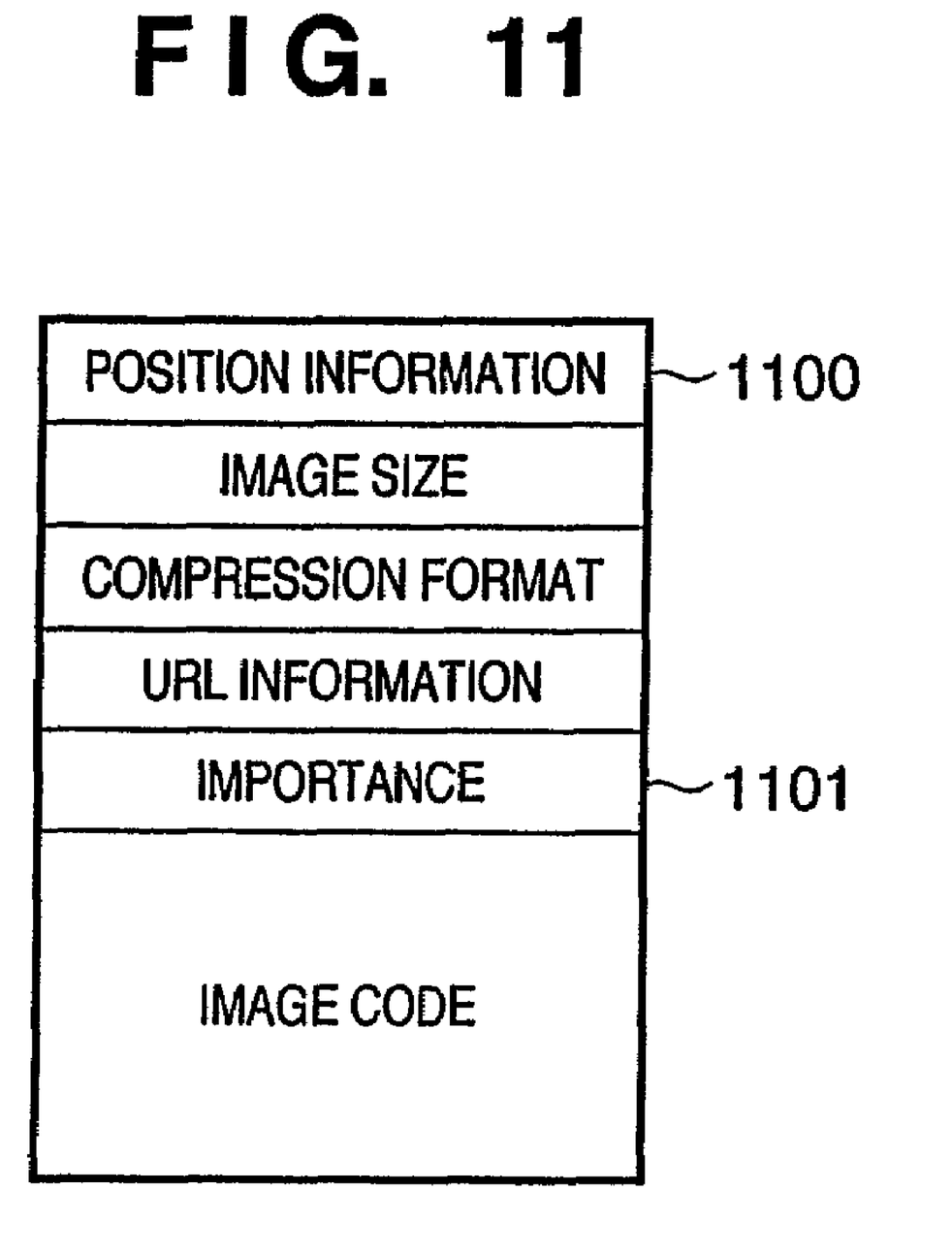
FIG. 11 is a diagram showing an example of a constitution of an image data portion of a print command.

FIG. 11 shows an example of a constitution of the image data portion in this embodiment.

FIG. 11 denotes a constitution of the image data portion which includes the information on importance anew. The importance determined in step S1002 is held in 1101.

Note that, since importance is not set for the character data portion, the same command as the format shown in FIG. 3 is generated.

Upon receiving the print command from the host computer 100, the printer 103 analyzes the print command in the bitmap data generation section 205 in step S1004. Then, the printer 103 does not change character data portions but judges importance only for image data portions in step S1005.

Then, the printer 103 does not change image data portions with high set importance such that print processing of the normal mode is performed. In addition, if necessary, the printer 103 deletes the item of importance in an image data portion to change it to the same constitution as the image data portion shown in FIG. 3. On the other hand, the printer 103 subjects image data portions with low importance to the high-speed mode print processing described above in step S1007.

Then, in step S1008, the printer 103 performs processing for generating bitmap data and print processing.

As a result, printing in the normal mode is performed for character information existing in the Web page and images for which high importance is set, and for images for which low importance is set, URLs corresponding to the images are printed instead of the images.

As described above, according to the second embodiment of the present invention, in printing a Web page, it is possible to determine importance for respective images in the Web page. Consequently, printing methods can be selected easily for respective pieces of image information, and print processing can be performed at a high speed and with toner consumption suppressed in conformity with an intention of a user.

Note that, in this embodiment, the case where setting of importance and generation of a print command, on which the importance is reflected, are performed on the host computer 100 side is described. However, it is also possible to execute the entire processing of FIGS. 10A and 10B in the printer 103 in the case where it is possible for the user to confirm contents of thumbnails and select thumbnails with the printer 103 such as the case where the printer 103 includes a color display device.

In addition, in this embodiment, the case where importance is set for respective images existing in a Web page to be printed is described. However, since a large number of images tend to be included in a Web page in recent years, importance of images may be set collectively by a unit of print page. In this case, instead of generating thumbnails of respective image, it is sufficient to generate a thumbnail of the entire page by a unit of print page and select importance. Further, in this case, it is sufficient to set importance, which is set for image data portions of a print command, commonly by a unit of selected print page.

Third Embodiment

In the second embodiment, importance of images is determined using thumbnails of the images. A third embodiment of the present invention is characterized in that importance of images is determined according to server names included in reference destinations (corresponding URLs) of the images.

In other words, an invention in accordance with this embodiment is an information processing apparatus which is characterized by including: a detection section which detects data representing reference destinations of image data included in a Web page instructed to be printed; an extraction section which extracts server names included in the data representing reference destinations; a setting section which refers to the extracted server names and information on correspondence between server names and importance registered in advance to set importance for each image data; and a print command generation section which, in accordance with the importance, generates a print command of the Web page instructed to be printed.

In this embodiment, first, the information processing apparatus detects reference destinations of image data existing in a Web page instructed to be printed from a markup language (HTML, XML, etc.) constituting the Web page. Then, the information processing apparatus refers to a table or the like storing correspondence between servers and importance decided in advance using names of servers (domains) where original image data exist included in the reference destinations to thereby automatically set importance for each image. In this case, if the setting has been made once, importance is automatically set without necessity for a user to select importance in detail. Naturally, in the case where unregistered domains exist or according to an instruction of the user, it is also possible to constitute the image processing apparatus so as to perform setting every time a Web page is printed.

Since processing after setting importance is as described in the second embodiment, the processing will not be described here.

As described above, according to the third embodiment of the present invention, in printing a Web page, importance is determined for respective images in the Web page for each server where image data of the images are placed. Consequently, importance of images can be determined more easily, and print processing can be performed at a high speed and with toner consumption suppressed in conformity with an intention of a user.

Note that, in the second and the third embodiments, it is needless to mention that association of importance and mode of image processing is not unique. In addition, other than printing URLs instead of images in the high-speed mode, an arbitrary method, which can realize toner saving and high-speed processing compared with the case where images are directly printed, such as shading processing or interpolation processing can be used.

Fourth Embodiment

In the first to the third embodiments, only the case where a print command is reconstituted in the image processing apparatus is described. However, it is also possible to perform the same processing on the host computer 100 side. In this case, although processing on the host computer 100 side increases, processing in a printer does not have to be changed from that in the past. In addition, an amount of data to be transferred to the printer decreases in the high-speed mode and the text mode. Thus, higher speed processing can be expected.

In this case, it is possible to directly generate a command after reconstitution according to a set mode without reconstituting a print command after generating it once. Thus, with such a constitution, higher speed processing can be expected.

In other words, in the processing in the first embodiment shown in FIG. 5, it is sufficient to cause a user to perform selection of a print mode in the host computer 100 and, in accordance with a result of the selection, if the high-speed mode or the text mode is set, directly generate a final print command without performing the print command analysis (steps S601 and S801) in FIGS. 6 and 8.

In addition, in the second and the third embodiments, it is sufficient to directly generate a final print command according to importance without adding the importance in a command. In other words, in FIG. 10, when importance of images is determined in step S1002, it is sufficient to perform processing in the normal mode or the high-speed print mode according to the importance and directly generate a final command, and then transfer the command to a printer.

Other Embodiments

In the above-described embodiments, in order to facilitate understanding of the invention, a Web page, in which images not required by a user are highly likely to be included, is described as an object of printing. However, it is evident that the present invention is applicable generally to printing of files in which texts and images are mixed. Therefore, in printing of a word processor document in which images and texts are mixed, it is possible to perform the processing just as described above except that an application running on a host computer is not a WWW browser but a document creation application.

Moreover, in the above-described embodiments, an object of simplification of printing is an image. However, in applications in recent years, there are a Web page, a word processor document, and the like in which voice files, motion picture files, and the like are included. Therefore, it is possible to arbitrarily set an object of simplification of printing other than an image.

Note that the present invention also includes the case where a program of software for realizing the function of the above-described embodiments (a program corresponding to the flowchart described in the embodiments) is supplied to a system or an apparatus having a computer, which is capable of executing the program, from a recording medium directly or using wire/wireless communication, and the computer of the system or the apparatus executes the supplied program, whereby equivalent functions are attained.

Therefore, a program code itself, which is supplied and installed in a computer in order to realize the functional processing of the present invention in the computer, also realizes the present invention. In other words, a computer program itself for realizing the functional processing of the present invention is also included in the present invention.

In that case, the program may take any form such as an object code, a program to be executed by an interpreter, or script data to be supplied to an OS as long as it has a function of a program.

As a recording medium for supplying a program, for example, there are a magnetic recording medium such as a flexible disk, a hard disk, or a magnetic tape, an optical/magneto-optical storage medium such as an MO, a CD-ROM, a CD-R, a CD-RW, a DVD-ROM, a DVD-R, or a DVD-RW, and a nonvolatile semiconductor memory.

As a method of supplying a program using wire/wireless communication, for example, there is a method of storing a computer program which forms the present invention in a server on a computer network or a data file which can be a computer program forming the present invention on a client computer (program data file) such as a file which is compressed and includes an automatic install function, and downloading a program data file to a client computer which has made an access. In this case, it is also possible to divide the program data file into a plurality of segment files and arrange the segment files in different servers.

In other words, a server apparatus, which causes a plurality of users to download a program data file for realizing the functional processing of the present invention with a computer, is also included in the present invention.

In addition, the program of the present invention is encrypted and the encrypted program is stored in a storage medium such as a CD-ROM and distributed to users satisfying predetermined conditions. The users are caused to download key information for decrypting the encrypted program from a home page via, for example, the Internet, whereby the key information is supplied to the users and the users are caused to execute the encrypted program using the key information and install the program in a computer. The functions of the embodiments can also be realized in this way.

Further, a computer executes a read-out program, whereby the functions of the embodiments are realized. In addition, an OS or the like running on the computer performs a part or the whole of actual processing on the basis of an instruction of the program. The functions of the embodiments are also realized by the processing.

Moreover, after a program read out from a recording medium is written in a memory provided in a function extending board inserted in a computer or a function extending unit connected to the computer, a CPU or the like provided in the function extending board or the function extending unit performs a part or the whole of actual processing on the basis of an instruction of the program, and the functions of the embodiments are also realized by the processing.

As described above, according to the present invention, in printing information including image information unnecessary for a user such as a Web page, it is made possible for the user to select how image information should be printed, whereby it becomes possible to improve a printing speed or prevent wasteful toner consumption.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
an analyzing unit which analyzes an input print command;
a determination unit which determines whether each data portion included in a print data section of the print command is an image data portion or a character data portion;
a deleting unit which deletes from the print command the data portion which is determined as the image data portion, without being printed;
a changing unit which changes a layout of the data portion determined as the character data portion;
a printing unit which prints the character data portion based on the changed layout; and
a mode detection unit which detects an operation mode in which the image processing apparatus is operating,
wherein said determination unit, said deleting unit and said changing unit are activated only in the case where the operation mode detected is a first mode, and
wherein said printing unit prints identification information indicating image data instead of the image data included in the image data portion in a case where the operation mode detected is a second mode.

2. The image processing apparatus according to claim 1, wherein, when the operation mode detected is neither the first nor the second mode, said printing unit prints all data portions included in the print command as specified in the print command.

3. The image processing apparatus according to claim 1, wherein the first mode is an operation mode, not for printing image data in a page displayed on a WWW browser, but for printing the page after cutting down a part where the image is arranged, and changing a layout of the page by flowing character data in the page into the part where the image was arranged.

4. An image processing method comprising:
   an analyzing step of analyzing an input print command;
   a determining step of determining whether each data portion included in a print data section of the print command is an image data portion or a character data portion;
   a deleting step which deletes from the print command the data portion which is determined as the image data portion, without being printed;
   a changing step of changing a layout of the data portion determined as the character data portion;
   a printing step of printing the character data portion based on the changed layout; and
   a mode detecting step of detecting an operation mode in which the image processing apparatus is operating,
   wherein said determining step, said deleting step and said changing step are activated only in the case where the operation mode detected is a first mode, and
   wherein, in said printing step, identification information is printed indicating image data instead of the image data included in the image data portion, in a case where the operation mode detected is a second mode.

5. The image processing method according to claim 4, wherein, when the operation mode detected is neither the first nor the second mode, said printing unit prints all data portions included in the print command as specified in the print command.

6. The image processing method according to claim 4, wherein the first mode is an operation mode, not for printing image data in a page displayed on a WWW browser, but for printing the page after cutting down a part where the image is arranged, and changing a layout of the page by flowing character data in the page into the part where the image was arranged.

7. A computer-readable medium storing a computer program for an image processing apparatus, the program comprising:
   an analyzing step of analyzing an input print command;
   a determining step of determining whether each data portion included in a print data section of the print command is an image data portion or a character data portion;
   a deleting step which deletes from the print command the data portion which is determined as the image data portion, without being printed;
   a changing step of changing a layout of the data portion determined as the character data portion;
   a printing step of printing the character data portion based on the changed layout; and
   a mode detecting step of detecting an operation mode in which the image processing apparatus is operating,
   wherein said determining step, said deleting step and said changing step are activated only in the case where the operation mode detected is a first mode, and
   wherein, in said printing step, identification information is printed indicating image data instead of the image data included in the image data portion, in a case where the operation mode detected is a second mode.

* * * * *